United States Patent
Do et al.

(10) Patent No.: US 9,955,354 B2
(45) Date of Patent: *Apr. 24, 2018

(54) APPARATUS AND METHOD FOR CONTROLLING SECURITY MODE IN WIRELESS COMMUNICATION SYSTEM

(71) Applicant: Samsung Electronics Co., Ltd., Gyeonggi-do (KR)

(72) Inventors: Ki-Hyun Do, Gyeonggi-do (KR); Jin-Young Oh, Gyeonggi-do (KR); Tu Nguyen, Gyeonggi-do (KR); Yong-Duk Cho, Seoul (KR)

(73) Assignee: Samsung Electronics Co., Ltd (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/686,984

(22) Filed: Aug. 25, 2017

(65) Prior Publication Data

US 2017/0353862 A1 Dec. 7, 2017

Related U.S. Application Data

(63) Continuation of application No. 14/953,945, filed on Nov. 30, 2015, now Pat. No. 9,749,868.

(30) Foreign Application Priority Data

Nov. 28, 2014 (KR) .................... 10-2014-0168788

(51) Int. Cl.
*H04W 12/10* (2009.01)
*H04L 29/06* (2006.01)
(Continued)

(52) U.S. Cl.
CPC .......... *H04W 12/10* (2013.01); *H04L 63/102* (2013.01); *H04L 63/123* (2013.01); *H04W 12/08* (2013.01); *H04W 76/06* (2013.01)

(58) Field of Classification Search
CPC ..... H04W 12/10; H04W 12/08; H04W 12/00; H04W 12/12; H04W 12/06; H04W 76/06;
(Continued)

(56) References Cited

U.S. PATENT DOCUMENTS 6,763,112 B1 7/2004 Haumont
2003/0100291 A1* 5/2003 Krishnarajah ...... H04L 12/2856
455/410

(Continued)

*Primary Examiner* — Meless Zewdu
(74) *Attorney, Agent, or Firm* — The Farrell Law Firm, P.C.

(57) ABSTRACT

Disclosed is a method for controlling a security mode by a user equipment (UE) in a wireless communication system, including performing a camp-on process and a cell update process with a network when an out-of-service (OOS) situation has occurred, receiving one of a signaling connection release (SCR) message and a first protocol data unit (PDU) which corresponds to the SCR message from the network, receiving a security mode command (SMC) message from the network if the SCR message is received, performing an integrity process on the SCR message using an old security configuration, and performing a rollback process to discard a new security configuration included in the SMC message if a result of the integrity process result an integrity check success, and updating a security configuration to the old security configuration.

20 Claims, 9 Drawing Sheets

(51) Int. Cl.
*H04W 12/08* (2009.01)
*H04W 76/06* (2009.01)

(58) Field of Classification Search
CPC ............ H04W 76/066; H04W 76/068; H04W 76/064; H04W 4/001; H04W 40/24; H04W 40/248; H04W 4/02; H04W 12/04; H04W 12/02; H04W 84/02; H04L 63/102; H04L 29/06; H04L 63/00; H04L 63/123; H04L 63/1408; H04L 63/0485; H04L 63/20; H04L 41/28
See application file for complete search history.

(56) References Cited

U.S. PATENT DOCUMENTS

| | | | |
|---|---|---|---|
| 2004/0162065 A1 | 8/2004 | Chun | |
| 2007/0033411 A1 | 2/2007 | Zhao et al. | |
| 2007/0072635 A1* | 3/2007 | Zhao | H04L 63/12 455/502 |
| 2007/0265875 A1* | 11/2007 | Jiang | H04L 63/068 455/550.1 |
| 2008/0101608 A1* | 5/2008 | Jiang | H04L 69/324 380/270 |
| 2010/0166184 A1 | 7/2010 | Wu | |
| 2010/0186063 A1 | 7/2010 | Oba | |
| 2010/0202618 A1* | 8/2010 | Yang | H04L 63/068 380/277 |
| 2010/0263040 A1* | 10/2010 | Norrman | H04L 63/12 726/13 |
| 2011/0072488 A1* | 3/2011 | Bi | H04L 63/108 726/1 |
| 2011/0207465 A1* | 8/2011 | Dwyer | H04W 76/046 455/450 |
| 2011/0263222 A1* | 10/2011 | Farnsworth | H04L 63/12 455/410 |
| 2011/0312299 A1* | 12/2011 | Patil | H04L 63/20 455/410 |
| 2012/0170744 A1 | 7/2012 | Cheng | |
| 2012/0183142 A1* | 7/2012 | Sharma | H04W 12/04 380/273 |
| 2012/0275340 A1* | 11/2012 | McGann | H04L 63/205 370/254 |
| 2013/0035056 A1* | 2/2013 | Prasad | H04W 12/06 455/404.1 |
| 2015/0072647 A1 | 3/2015 | Rogers | |
| 2015/0082444 A1* | 3/2015 | Rogers | H04W 12/08 726/26 |
| 2015/0094065 A1 | 4/2015 | Su | |
| 2016/0142087 A1 | 5/2016 | Inampudi | |

\* cited by examiner

APPARATUS AND METHOD FOR CONTROLLING SECURITY MODE IN WIRELESS COMMUNICATION SYSTEM

PRIORITY

This application is a Continuation of application Ser. No. 14/953,945, filed with the U.S. Patent and Trademark Office on Nov. 30, 2015, and claims priority under 35 U.S.C. § 119(a) to Korean Application Serial No. 10-2014-0168788 filed in the Korean Intellectual Property Office on Nov. 28, 2014, the entire content of which is incorporated herein by reference.

BACKGROUND

1. Field of the Disclosure

The present disclosure relates generally to an apparatus and method for controlling a security mode in a wireless communication system, and more particularly, to an apparatus and method for controlling a security mode such that a security configuration set in a user equipment (UE) is identical to a security configuration set in a network in a wireless communication system.

2. Description of the Related Art

In a radio communication system, a security process is vital to ensuring system reliability. For example, a security process includes an integrity process and a ciphering process in a radio communication system such as a universal mobile telecommunication system (UMTS), a code division multiple access (CDMA) mobile telecommunication system, a long-term evolution (LTE) mobile telecommunication system, and a long-term evolution-advanced (LTE-A) mobile telecommunication system.

The integrity process ensures no rogue network will be able to transmit unnecessary signaling messages to cause or intend to cause any undesired effect in an ongoing call.

The ciphering process ensures all signaling messages and data messages are ciphered over an air interface to inhibit a third party from eavesdropping on the signaling and data messages.

In a wireless communication system, a UE typically negotiates with a network to set security parameters such as encryption keys for use in encrypting (or ciphering) communications between the UE and each of network entities included in the network. The security parameters may be updated and/or changed to ensure secrecy of data transmitted/received between the UE and the network entities.

Specifically, a network transmits a security mode command (SMC) message including security parameters to a UE. After receiving the SMC message from the network, the UE sets or updates security parameters based on the security parameters included in the SMC message. Security parameters which have been previously set will be referred to herein as 'old security parameters', and security parameters which are newly set will be referred to herein as 'new security parameters'.

The UE updates the security parameters which have been set in the UE to the new security parameters, and uses the new security parameters. The UE transmits an SMC complete message as a response message to the SMC message to the network before using the new security parameters. After receiving the SMC complete message from the UE, the network communicates with the UE using the new security parameters.

Even though the network transmits the SMC message to the UE, an out-of-service (OOS) situation may occur due to various reasons, and thus the UE is unable to receive the SMC message. In this case, the UE is also unable to transmit the SMC complete message as the response message to the SMC message to the network. Thus, the network detects that it is impossible to communicate with the UE using the new security parameters.

As such, the network performs a rollback process for the new security parameters to discard the new security parameters, and reuses the old security parameters.

If the UE is no longer in the OOS situation and receives the SMC message which the network has transmitted, the UE updates the new security parameters included in the SMC message and communicates with the network using the new security parameters.

In this case, the UE communicates with the network using the new security parameters and the network communicates with the UE using the old security parameters. Accordingly, a normal communication becomes impossible due to an incongruity between the security parameters used in the UE and the security parameters used in the network.

Accordingly, there is a need in the art for a method for controlling a security mode such that security parameters, i.e., a security configuration used in a UE corresponds to a security configuration used in a network.

The above information is presented as background information only to assist with an understanding of the present disclosure. No determination has been made, and no assertion is made, as to whether any of the above might be applicable as prior art with regard to the present disclosure.

SUMMARY

Accordingly, an aspect of the present disclosure is to provide an apparatus and method for controlling a security mode in a wireless communication system.

Another aspect of the present disclosure is to provide an apparatus and method for controlling a security mode such that a security configuration set in a UE is identical to a security configuration set in a network in a wireless communication system.

Another aspect of the present disclosure is to provide an apparatus and method for controlling a security mode by considering communication status of a UE in a wireless communication system.

Another aspect of the present disclosure is to provide an apparatus and method for controlling a security mode based on an integrity check result in a wireless communication system.

Another aspect of the present disclosure is to provide an apparatus and method for controlling a security mode based on a deciphering result in a wireless communication system.

In accordance with an aspect of the present disclosure, a method for controlling a security mode by a terminal in a wireless communication system includes performing a camp-on process and a cell update process with a network when an out-of-service (OOS) situation has occurred, receiving a signaling connection release (SCR) message from the network, receiving a security mode command (SMC) message from the network, performing an integrity process on the SCR message using an old security configuration, and performing a rollback process to discard a new security configuration included in the SMC message if a result of the integrity process indicates an integrity check success, and updating a security configuration to the old security configuration.

In accordance with another aspect of the present disclosure, a method for controlling a security mode by a terminal includes performing a camp-on process and a cell update process with a network when an OOS situation has occurred, receiving a first protocol data unit (PDU) which corresponds to an SCR message from the network, detecting that at least one PDU of which a PDU serial number (SN) less than PDU SN of the first PDU has been missing, transmitting a non-acknowledgement (NACK) message for the at least one PDU to the network, receiving the at least one PDU which corresponds to a security mode command (SMC) message from the network, performing an integrity process on the first PDU using an old security configuration, and performing a rollback process to discard a new security configuration included in the at least one PDU if the integrity process result indicates an integrity check success, and updating a security configuration to the old security configuration.

In accordance with another aspect of the present disclosure, a method for controlling a security mode by a network in a wireless communication system includes transmitting an SMC message including a new security configuration to a terminal, updating a security configuration to the new security configuration, performing a rollback process to discard the new security configuration, and updating the security configuration into an old security configuration upon detecting that the terminal is in an OOS situation after transmitting the SMC message, performing a camp-on process and a cell update process with the UE, transmitting a signaling connection release (SCR) message to the terminal, receiving a NACK message for the SMC message from the terminal, retransmitting the SMC message to the terminal, and detecting that the terminal has performed the rollback process to discard the new security configuration and updated the security configuration to the old security configuration upon detecting that the terminal has successfully received at least one other message after successfully receiving the at least one other message from the terminal or transmitting the at least one other message to the terminal, after retransmitting the SMC message.

In accordance with another aspect of the present disclosure, a method for controlling a security mode by a network in a wireless communication system includes transmitting at least one PDU which corresponds to an SMC message including a new security configuration to a terminal, updating a security configuration to the new security configuration, performing a rollback process to discard the new security configuration, and updating the security configuration into an old security configuration upon detecting that the terminal is in an OOS situation after transmitting the at least one PDU, performing a camp-on process and a cell update process with the UE, transmitting a first PDU which corresponds to an SCR message to the terminal, receiving a NACK message for the at least one PDU, retransmitting the at least one PDU to the terminal, and detecting that the terminal has performed the rollback process to discard the new security configuration, and updated the security configuration to the old security configuration upon detecting that the terminal has successfully received at least one other message after successfully receiving the at least one other message from the terminal or transmitting the at least one other message to the terminal, after retransmitting the at least one PDU.

In accordance with another aspect of the present disclosure, a terminal in a wireless communication system includes a transmitter, a receiver, and a controller, wherein the transmitter and the receiver perform performing a camp-on process and a cell update process with a network when an OOS situation has occurred, wherein the receiver receives an SCR message from the network, and receives an SMC message from the network, and wherein the controller performs an integrity process on the SCR message using an old security configuration, and performs a rollback process to discard a new security configuration included in the SMC message if a result of the integrity process indicates an integrity check success, and updating a security configuration to the old security configuration.

In accordance with another aspect of the present disclosure, a terminal in a wireless communication system includes a transmitter, a receiver, and a controller, wherein the transmitter and the receiver perform a camp-on process and a cell update process with a network when an OOS situation has occurred, wherein the receiver receives a first PDU which corresponds to an SCR message from the network, wherein the controller detects that at least one PDU of which a PDU SN is less than a PDU SN of the first PDU has been missing, wherein the transmitter transmits a NACK message for the at least one PDU to the network, wherein the receiver receives the at least one PDU which corresponds to a security mode command (SMC) message from the network, and wherein the controller performs an integrity process on the first PDU using an old security configuration, and performs a rollback process to discard a new security configuration included in the at least one PDU if a result of the integrity process indicates an integrity check success, and to update a security configuration to the old security configuration.

In accordance with another aspect of the present disclosure, a network in a wireless communication system includes a transmitter, a receiver, and a controller, wherein the transmitter transmits an SMC message including a new security configuration to a terminal, wherein the controller updates a security configuration to the new security configuration, performs a rollback process to discard the new security configuration, and updates the security configuration into an old security configuration upon detecting that the terminal is in an OOS situation after the transmitter transmits the SMC message, wherein the transmitter and the receiver perform a camp-on process and a cell update process with the terminal, wherein the transmitter transmits an SCR message to the terminal, wherein the receiver receives a NACK message for the SMC message from the terminal, wherein the transmitter retransmits the SMC message to the terminal, and wherein the controller detects that the terminal has performed a rollback process to discard the new security configuration, and has updated the security configuration to the old security configuration upon detecting that the network has successfully received at least one other message after the receiver successfully receives the at least one other message from the terminal or the transmitter transmits the at least one other message to the terminal, after the transmitter retransmits the SMC message.

In accordance with another aspect of the present disclosure, a network in a wireless communication system includes a transmitter, a receiver, and a controller, wherein the transmitter transmits at least one PDU which corresponds to an SMC message including a new security configuration to a terminal, wherein the controller updates a security configuration to the new security configuration, wherein the controller performs a rollback process to discard the new security configuration, and updates the security configuration into an old security configuration upon detecting that the terminal is in an OOS situation after the transmitter transmits the at least one PDU, wherein the transmitter and the receiver perform a camp-on process and a cell update process with the terminal, wherein the transmitter transmits a first PDU which corresponds to an SCR message to the terminal, wherein the receiver receives a NACK message for the at least one PDU, wherein the transmitter retransmits the at least one PDU to the terminal, and wherein the controller detects that the terminal has performed a rollback process to discard the new security configuration, and has updated the security configuration to the old security configuration upon detecting that the terminal has successfully received at least one other message after the receiver successfully receives the at least one other message from the terminal or the transmitter transmits the at least one other message to the terminal, after the transmitter retransmits the at least one PDU.

BRIEF DESCRIPTION OF THE DRAWINGS

The above and other aspects, features and advantages of certain embodiments of the present disclosure will be more apparent from the following description taken in conjunction with the accompanying drawings, in which.

Throughout the drawings, it should be noted that like reference numbers are used to depict identical or similar elements, features, and structures.

DETAILED DESCRIPTION OF EMBODIMENTS OF THE PRESENT DISCLOSURE

Figure 1A:
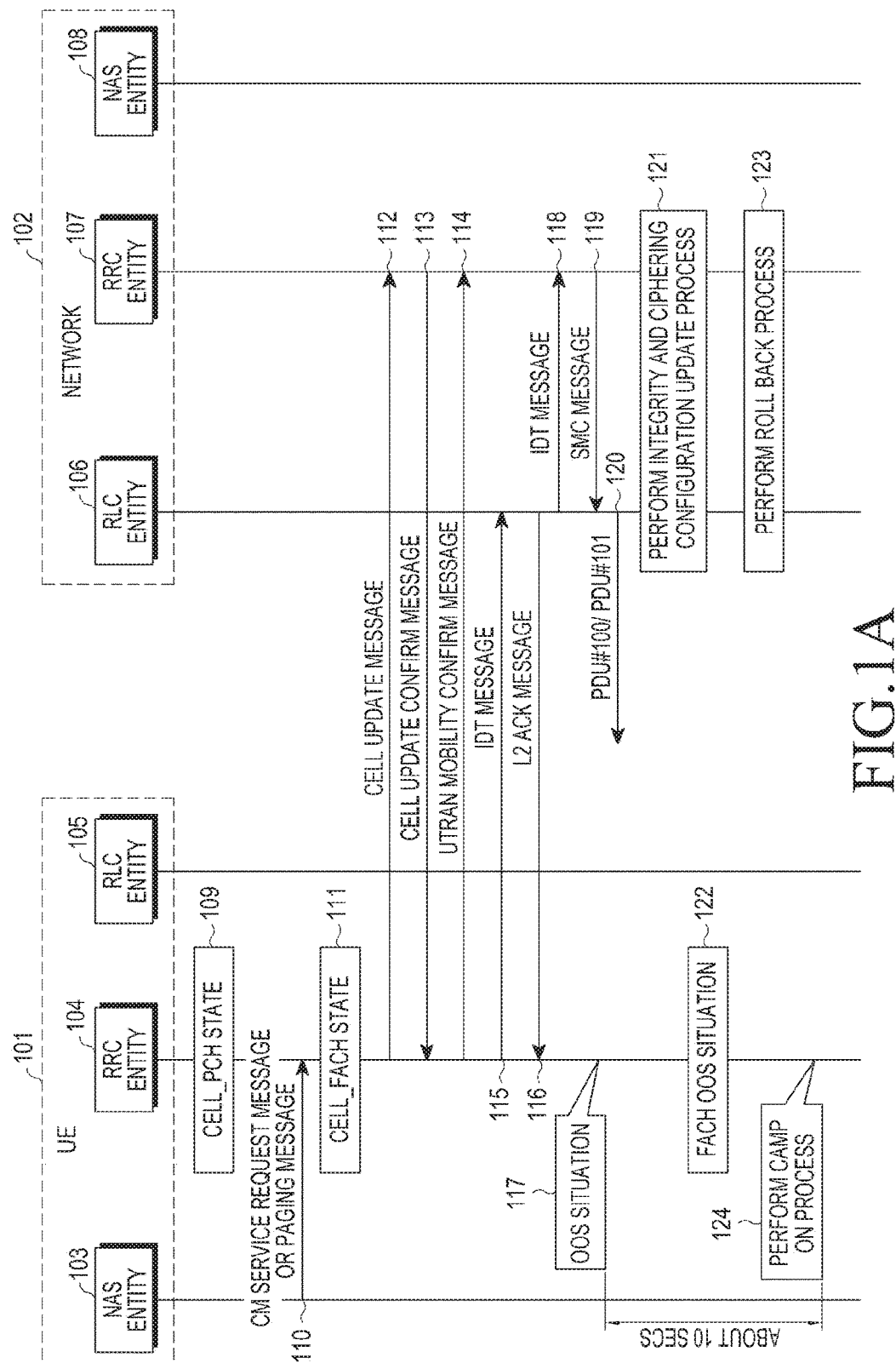
FIGS. 1A and 1B illustrate an example of a process of controlling a security mode in a wireless communication system according to an embodiment of the present disclosure.

The following description with reference to the accompanying drawings is provided to assist in a comprehensive understanding of embodiments of the present disclosure as defined by the claims and their equivalents. It includes various specific details to assist in that understanding but these are to be regarded as merely examples. Accordingly, those of ordinary skill in the art will recognize that various changes and modifications of the embodiments described herein can be made without departing from the scope and spirit of the present disclosure. In addition, descriptions of well-known functions and constructions may be omitted for the sake of clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of embodiments of the present disclosure is provided for illustration purposes only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Although ordinal numbers such as "first," "second," and so forth will be used to describe various components, those components are not limited herein. The terms are used only for distinguishing one component from another component. For example, a first component may be referred to as a second component and likewise, a second component may also be referred to as a first component, without departing from the teaching of the inventive concept.

The term "and/or" used herein includes any and all combinations of one or more of the associated listed items.

It will be further understood that the terms "comprises" and/or "has," when used in this specification, specify the presence of a stated feature, number, step, operation, component, element, or combination thereof, but do not preclude the presence or addition of one or more other features, numbers, steps, operations, components, elements, or combinations thereof.

The terms used herein, including technical and scientific terms, have identical meanings as terms that are generally understood by those skilled in the art, as long as the terms are not differently defined. It should be understood that terms defined in a generally-used dictionary have meanings coinciding with those of terms in the related technology.

According to embodiments of the present disclosure, an electronic device may include communication functionality. For example, an electronic device may be a smart phone, a tablet personal computer (PC), a mobile phone, a video phone, an e-book reader, a desktop PC, a laptop PC, a netbook PC, a personal digital assistant (PDA), a portable multimedia player (PMP), an mp3 player, a mobile medical device, a camera, and a wearable device such as a head-mounted device (HMD, electronic clothes, electronic braces, an electronic necklace, an electronic appcessory, an electronic tattoo, or a smart watch.

According to embodiments of the present disclosure, an electronic device may be a smart home appliance with communication functionality, such as a television, a digital video disc (DVD) player, an audio, a refrigerator, an air conditioner, a vacuum cleaner, an oven, a microwave oven, a washer, a dryer, an air purifier, a set-top box, a TV box such as Samsung HomeSync™, Apple TV™, or Google TV™, a gaming console, an electronic dictionary, an electronic key, a camcorder, and an electronic picture frame.

According to embodiments of the present disclosure, an electronic device may be a medical device such as a magnetic resonance angiography (MRA) device, a magnetic resonance imaging (MRI) device, computed tomography (CT) device, an imaging device, and an ultrasonic device, a navigation device, a global positioning system (GPS) receiver, an event data recorder (EDR), a flight data recorder (FDR), an automotive infotainment device, a naval electronic device such as a naval navigation device, gyroscope, or compass, an avionic electronic device, a security device, and an industrial or consumer robot.

According to embodiments of the present disclosure, an electronic device may be furniture, part of a building/ structure, an electronic board, electronic signature receiving device, a projector, and various measuring devices such as water, electricity, gas and electro-magnetic wave-measuring devices that include communication functionality.

According to embodiments of the present disclosure, an electronic device may be any combination of the foregoing devices.

In addition, it will be apparent to one having ordinary skill in the art that an electronic device according to embodiments of the present disclosure is not limited to the foregoing devices.

An embodiment of the present disclosure provides an apparatus and method for controlling a security mode in a wireless communication system.

An embodiment of the present disclosure provides an apparatus and method for controlling a security mode such that a security configuration set in a UE is identical to a security configuration set in a network in a wireless communication system.

An embodiment of the present disclosure provides an apparatus and method for controlling a security mode by considering communication status of a UE in a wireless communication system.

An embodiment of the present disclosure provides an apparatus and method for controlling a security mode based on an integrity check result in a wireless communication system.

An embodiment of the present disclosure provides an apparatus and method for controlling a security mode based on a deciphering result in a wireless communication system.

In accordance with an embodiment of the present disclosure, a security process includes an integrity process and a ciphering process.

In accordance with an embodiment of the present disclosure, a security configuration includes security parameters which are used in a security mode such as a hyper frame number (HFN) on which the security configuration will be newly applied, and activation time at which the HFN will be applied for each radio bearer (RB). For example, the activation time may be given with a format of a protocol data unit (PDU) serial number (SN). The security parameters may be implemented with various formats, and a detailed description will be omitted herein.

In accordance with an embodiment of the present disclosure, a network may include a plurality of entities. For example, the network may be an enhanced node B (eNB).

Definitions of certain words and phrases used throughout this patent document are as follows: The terms "include" and "comprise," as well as derivatives thereof, indicate inclusion without limitation, the term "or," is inclusive, indicating and/or, the phrases "associated with" and "associated therewith," as well as derivatives thereof, may indicate to include, be included within, interconnect with, contain, be contained within, connect to or with, couple to or with, be communicable with, cooperate with, interleave, juxtapose, be proximate to, be bound to or with, have, have a property of, or the like, and the term "controller" indicates any device, system or part thereof that controls at least one operation, such a device may be implemented in hardware, firmware or software, or some combination of at least two of identical. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

A method and apparatus provided in an embodiment of the present disclosure may be applied to various communication systems such as an institute of electrical and electronics engineers (IEEE) 802.11ac communication system, an IEEE 802.16 communication system, a digital video broadcasting system such as a mobile broadcasting service such as a digital multimedia broadcasting (DMB) service, and a digital video broadcasting-handheld (DVP-H) service, an advanced television systems committee-mobile/handheld (ATSC-M/H) service, and an internet protocol television (IPTV) service, a moving picture experts group (MPEG) media transport (MMT) system, an evolved packet system (EPS), a long term evolution (LTE) mobile communication system, an LTE-advanced (LTE-A) mobile communication system, a high speed downlink packet access (HSDPA) mobile communication system, a high speed uplink packet access (HSUPA) mobile communication system, a high rate packet data (HRPD) mobile communication system proposed in a $3^{rd}$ generation project partnership 2 (3GPP2), a wideband code division multiple access (WCDMA) mobile communication system proposed in the 3GPP2, a code division multiple access (CDMA) mobile communication system proposed in the 3GPP2, an institute of electrical and electronics engineers (IEEE) mobile communication system, and a mobile internet protocol (Mobile IP) system.

Figure 1B:
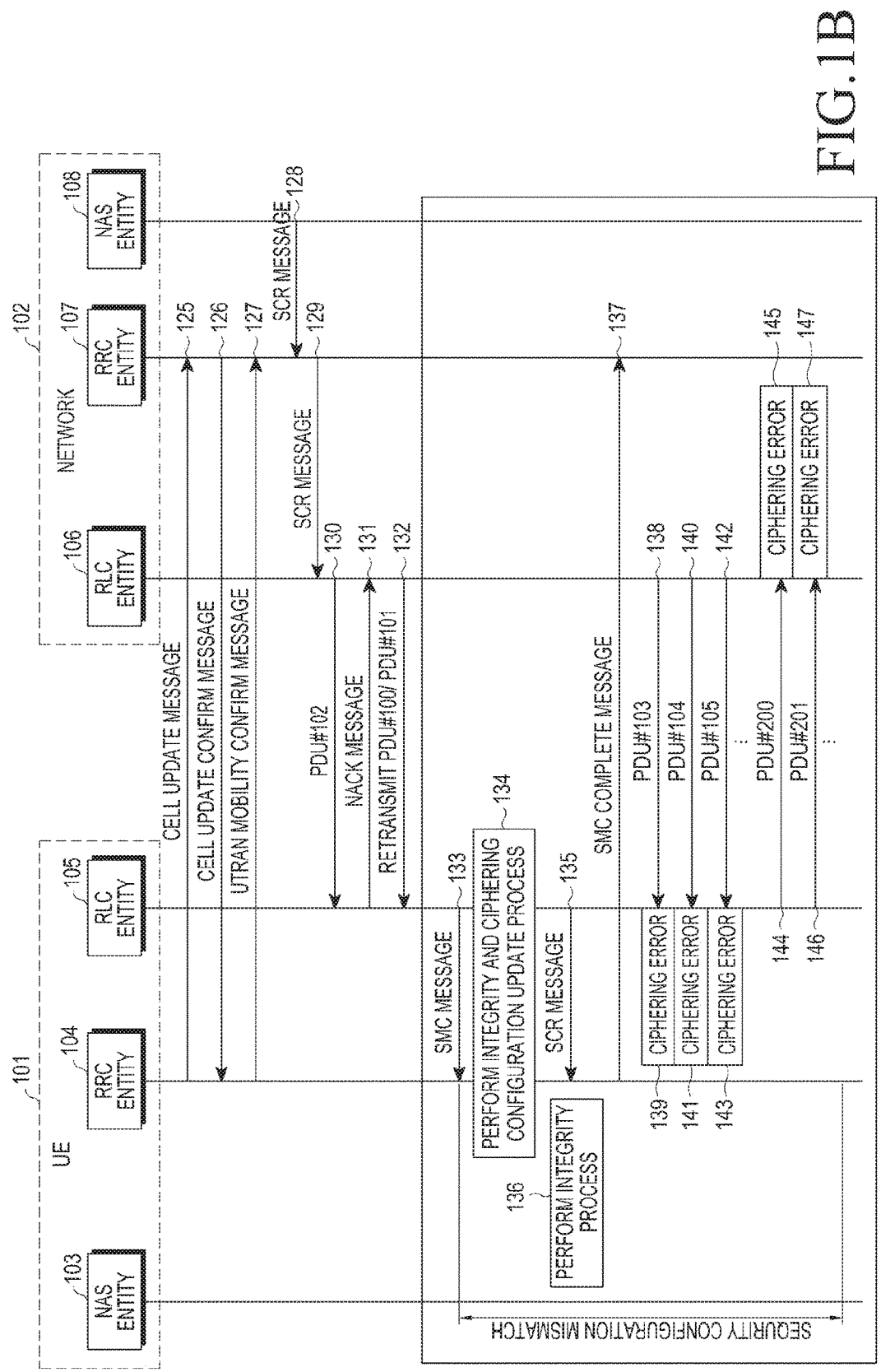

FIGS. 1A and 1B illustrate an example of a process of controlling a security mode in a wireless communication system according to an embodiment of the present disclosure.

Referring to FIGS. 1A and 1B, the wireless communication system includes a UE 101, and a network 102 such as an eNB.

The UE 101 includes a non-access-stratum (NAS) entity 103, a radio resource control (RRC) entity 104, and a radio link control (RLC) entity 105, which may be separate or incorporated into a single unit.

The network 102 includes an RLC entity 106, an RRC entity 107, and a NAS entity 108, which may be separate or may be incorporated into a single unit.

The UE 101 is a mobile originated (MO) UE, and the RRC entity 104 of the UE 101 exists in a cell_paging channel (Cell_PCH) state at step 109. In the Cell_PCH state, the RRC entity 104 of the UE 101 receives a connection management (CM) service request message for an MO voice call or a paging message for a mobile terminated (MT) voice call from the NAS entity 103 of the UE 101 at step 110.

Thereafter, the RRC entity 104 of the UE 101 transitions from the Cell_PCH state into a cell_forward access channel (Cell_FACH) state at step 111. The RRC entity 104 of the UE 101 performs a cell update process with the RRC entity 107 of the network 102, which process will be described below.

The RRC entity 104 of the UE 101 transmits a cell update message to the RRC entity 107 of the network 102 at step 112. The RRC entity 107 of the network 102 transmits a cell update confirm message as a response message to receiving the cell update message to the RRC entity 104 of the UE 101 at step 113. After receiving the cell update confirm message from the RRC entity 107 of the network 102, the RRC entity 104 of the UE 101 transmits a UMTS terrestrial radio access network (UTRAN) mobility confirm message to the RRC entity 107 of the network 102 at step 114.

After performing the cell update process with the RRC entity 107 of the network 102, the RRC entity 104 of the UE 101 transmits an initial data transfer (IDT) message to the RLC entity 106 of the network 102 at step 115, the RLC entity 106 of the network 102 transmits a layer 2 acknowledgement (L2 ACK) message for receiving the IDT message to the RRC entity 104 of the UE 101 at step 116.

The RRC entity 104 of the UE 101 receives the L2 ACK message from the RLC entity 106 of the network 102. The RRC entity 104 of the UE 101 may be in an out-of-service (OOS) situation due to various reasons at step 117.

After transmitting the L2 ACK message to the RRC entity 104 of the UE 101, the RLC entity 106 of the network 102 transmits an IDT message to the RRC entity 107 of the network 102 at step 118. After receiving the IDT message from the RLC entity 106 of the network 102, the RRC entity 107 of the network 102 transmits an SMC message to the RLC entity 106 of the network 102 at step 119. For example, the SMC message includes security parameters such as a hyper frame number (HFN) and activation time which may be implemented with various formats, and a description thereof will be omitted herein. The security parameters included in the SMC message are new security parameters which are updated compared to old security parameters.

After receiving the SMC message from the RRC entity 107 of the network 102, the RLC entity 106 of the network 102 transmits PDU#100 and PDU#101, which correspond to the SMC message, to the RLC entity 105 of the UE 101 at step 120.

The RLC entity 106 and RRC entity 107 of the network 102 perform an integrity and ciphering configuration update process based on the new security parameters, i.e. the HFN and the activation time included in the SMC message at step 121. The activation time denotes time from which the HFN included in the SMC message will be applied.

As described above, the RRC entity 104 of the UE 101 is in an OOS situation, and thus may not receive the SMC message (i.e., PDU #100 and PDU #101)transmitted by the RRC entity 107 of the network 102. Thus, the RRC entity 104 of the UE 101 loses synchronization with a serving cell, and enters the FACH OOS situation at step 122.

The RRC entity 107 of the network 102 recognizes that the RRC entity 104 of the UE 101 enters the FACH OOS situation. Thus, the RLC entity 106 and RRC entity 107 of the network 102 perform a rollback process to update security parameters into old security parameters at step 123. For example, if an SMC complete message is not received from the RRC entity 104 of the UE 101, the RRC entity 107 of the network 102 recognizes that the RRC entity 104 of the UE 101 enters the FACH OOS situation.

The RRC entity 104 of the UE 101 which is in the FACH OOS situation performs a cell reselection process to select a new cell, and performs a camp-on process for the new cell at step 124. In FIGS. 1A and 1B, it will be assumed that about 10 seconds elapse from a timing point at which the RRC entity 104 of the UE 101 enters an OOS situation to a timing point at which the RRC entity 104 of the UE 101 performs the camp-on process for the new cell. After performing the camp-on process for the new cell, the RRC entity 104 of the UE 101 performs a cell update process by transmitting a cell update message to the RRC entity 107 of the network 102 at step 125. The RRC entity 107 of the network 102 transmits a cell update confirm message as a response message to receiving the cell update message to the RRC entity 104 of the UE 101 at step 126. After receiving the cell update confirm message from the RRC entity 107 of the network 102, the RRC entity 104 of the UE 101 transmits a UTRAN mobility confirm message to the RRC entity 107 of the network 102 at step 127.

If a process for IDT for an old voice call is not performed during preset time, the NAS entity 108 of the network 102 determines to release a connection which is established in a related domain, and transmits an SCR message to the RRC entity 107 of the network 102 at step 128. The preset time may be changed according to a system situation of the wireless communication system, and it will be assumed that the preset time is set to less than 10 seconds in FIGS. 1A and 1B. That is, since it has been assumed that about 10 seconds elapses from when the RRC entity 104 of the UE 101 enters the OOS situation to when the RRC entity 104 of the UE 101 performs the camp-on process for the new cell, the NAS entity 108 of the network 102 determines to release the connection.

After receiving the SCR message from the NAS entity 108 of the network 102, the RRC entity 107 of the network 102 transmits an SCR message to the RLC entity 106 of the network 102 at step 129. The RLC entity 106 of the network 102 generates PDU#102 corresponding to the SCR message and transmits to the RLC entity 105 of the UE 101 at step 130. PDU#102 corresponding to the SCR message is generated after the rollback process is performed, and is ciphered based on old security parameters and transmitted to the RLC entity 105 of the UE 101.

After performing the cell update process according to the cell reselection process, the RLC entity 105 of the UE 101 receives PDU#102 transmitted by the RLC entity 106 of the network 102. Since the RLC entity 105 of the UE 101 does not receive the SMC message, the RLC entity 105 of the UE 101 performs a deciphering process on PDU#102 received from the RLC entity 106 of the network 102 based on the old security parameters, by detecting that PDU#100 and PDU#101 are missing within a reception window.

Thus, the RLC entity 105 of the UE 101 transmits a NACK message including PDU SNs of the missing PDUs to the RLC entity 106 of the network 102 in order to recover data for the missing PDUs at step 131.

After receiving the NACK message including PDU SNs of the missing PDUs from the RLC entity 105 of the UE 101, the RLC entity 106 of the network 102 transmits PDUs which correspond to PDU SNs included in the NACK message, i.e., PDU#100 and PDU#101 to the RLC entity 105 of the UE 101 at step 132. The RLC entity 105 of the UE 101 generates an SMC message based on the received PDU#100 and PDU#101 and transmits the generated SMC message to the RRC entity 104 of the UE 101 at step 133. The generated SMC message is the SMC message which has not been received due to the FACH OOS situation.

After receiving the SMC message from the RLC entity 105 of the UE 101, the RRC entity 104 of the UE 101 performs an integrity and ciphering configuration update process based on new security parameters included in the SMC message with the RLC entity 105 of the UE 101 at step 134. The RLC entity 105 of the UE 101 generates an SCR message based on PDU#102 received from the RLC entity 106 of the network 102 and transmits the SCR message to the RRC entity 104 of the UE 101 at step 135.

After receiving the SCR message from the RLC entity 105 of the UE 101, the RRC entity 104 of the UE 101 performs an integrity process on the SCR message based on a new integrity parameter according to the result of the integrity and ciphering configuration update process, i.e., a new HFN at step 136. As described above, the RLC entity 106 and RRC entity 107 of the network 102 have updated the security parameters to the old security parameters according to the rollback process, and the RRC entity 104 and RLC entity 105 of the UE 101 have updated the security parameters to the new security parameters. Thus, the result of the integrity process which is performed on the SCR message indicates an integrity check failure.

The RRC entity 104 of the UE 101 transmits an SMC complete message to the RRC entity 107 of the network 102 in response to the SMC message received from the RLC entity 105 of the UE 101 at step 137.

The RLC entity 106 of the network 102 transmits the next PDUs such as PDU#103, PDU#104, and PDU#105 to the RLC entity 105 of the UE 101 at steps 138, 140, and 142. The next PDUs are generated by applying a ciphering process based on old security parameters.

After receiving the next PDUs from the RLC entity 106 of the network 102, the RLC entity 105 of the UE 101 performs a deciphering process on the received PDUs based on new security parameters. As described above, the RLC entity 106 and RRC entity 107 of the network 102 have updated the security parameters to the old security parameters according to the rollback process, and the RRC entity 104 and RLC entity 105 of the UE 101 have updated the security parameters to the new security parameters. Thus, the result of the deciphering process which is performed on the received PDUs indicates a ciphering error at steps 139, 141, and 143. PDUs of which the result of the deciphering process indicates the ciphering error, i.e., the next PDUs are discarded.

In this manner, the RLC entity 105 of the UE 101 transmits the next PDUs such as PDU#200 and PDU#201, to the RLC entity 106 of the network 102 at steps 144 and 146, wherein the next PDUs are generated by applying a ciphering process based on new security parameters.

After receiving PDU#200 and PDU#201, from the RLC entity 105 of the UE 101, the RLC entity 106 of the network 102 performs a deciphering process on the received PDUs based on old security parameters. As described above, the RLC entity 106 and RRC entity 107 of the network 102 have updated the security parameters to the old security parameters according to the rollback process, and the RRC entity 104 and RLC entity 105 of the UE 101 have updated the security parameters to the new security parameters. Thus, the result of the deciphering process which is performed on the received PDUs indicates a ciphering error at operations 145 and 147. PDUs of which the result of the deciphering process indicates the ciphering error, PDU#200 and PDU#201 are discarded.

As described above, the UE 101 communicates with the network 102 using the new security parameters, and the network 102 communicates with the UE 101 using the old security parameters through the rollback process. Thus, a communication between the UE 101 and the network 102 becomes impossible due to an incongruity between security parameters used in the UE 101 and security parameters used in the network 102. Thus, the UE 101 is at an impasse until the security parameters used in the UE 101 and the security parameters used in the network 102 are identical. In the impasse, the UE 101 may not normally process a paging message even though the UE 101 receives the paging message.

Figure 2A:
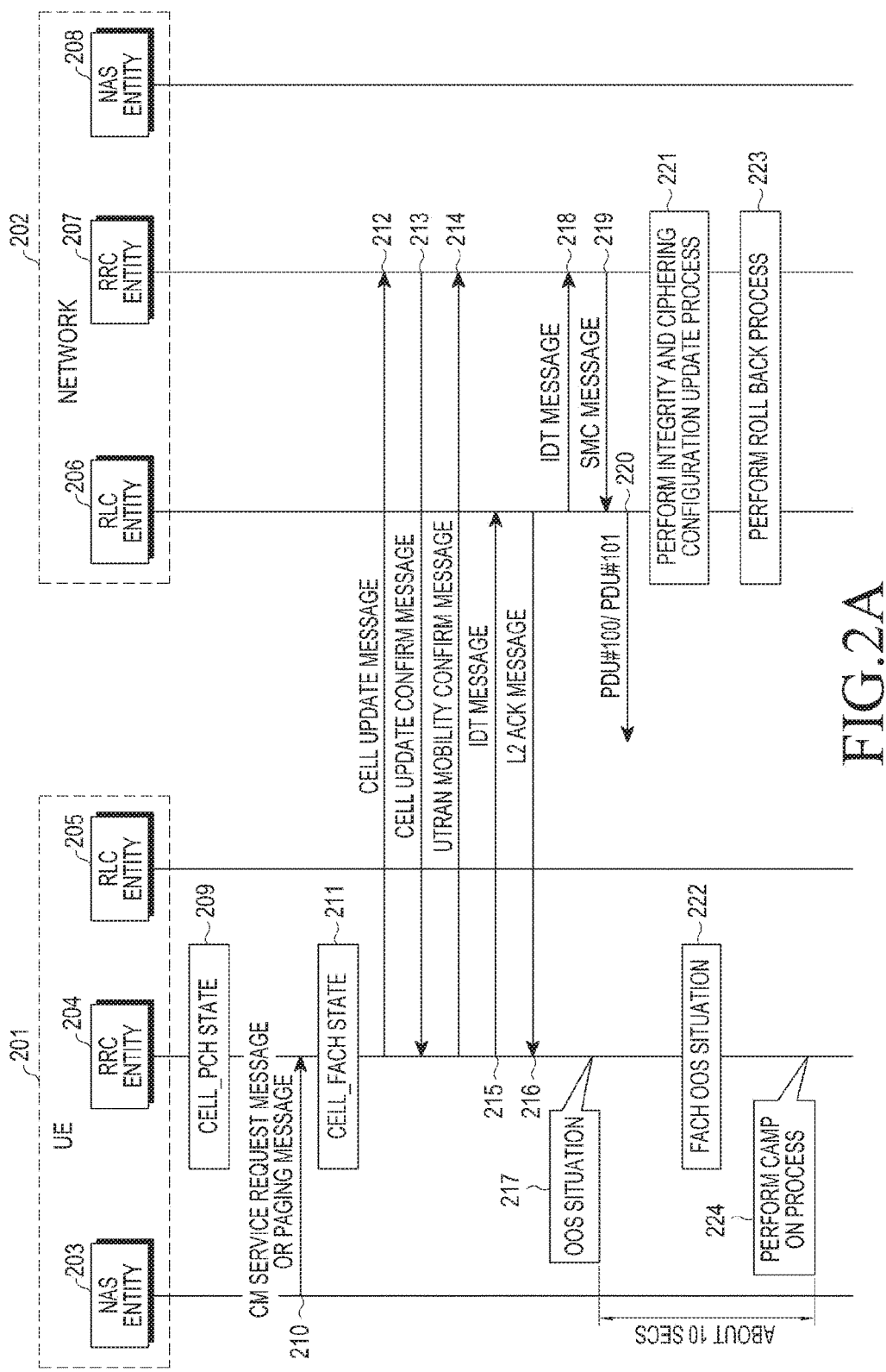
FIGS. 2A and 2B illustrate another example of a process of controlling a security mode in a wireless communication system according to an embodiment of the present disclosure.
Figure 2B:
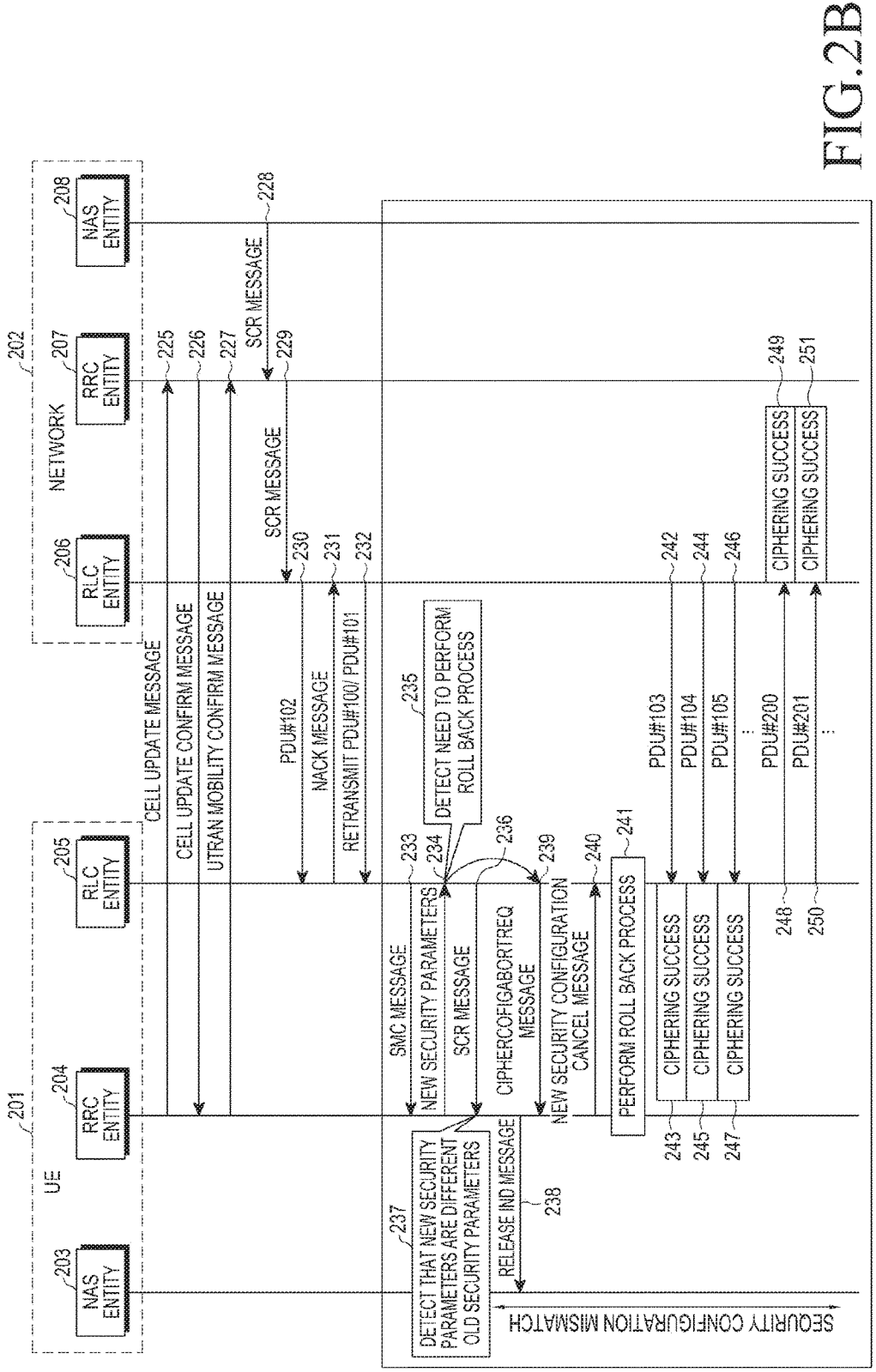

FIGS. 2A and 2B illustrate another example of a process of controlling a security mode in a wireless communication system according to an embodiment of the present disclosure.

Referring to FIGS. 2A and 2B, the wireless communication system includes a UE 201, and a network 202 such as an eNB.

The UE 201 includes a NAS entity 203, an RRC entity 204, and an RLC entity 205 which may be separate or incorporated into a single unit.

The network 202 includes an RLC entity 206, an RRC entity 207, and a NAS entity 208 which may be separate or incorporated into a single unit.

The UE 201 is an MO UE, and the RRC entity 204 of the UE 201 exists in a Cell_PCH state at step 209, in which state the RRC entity 204 receives a CM service request message for an MO voice call or a paging message for an MT voice call from the NAS entity 203 at step 210.

After receiving the CM service request message or the paging message from the NAS entity 203, the RRC entity 204 of the UE 201 transitions from the Cell_PCH state into a Cell_FACH state at step 211. The RRC entity 204 of the UE 201 performs a cell update process with the RRC entity 207 of the network 202.

Specifically, the RRC entity 204 of the UE 201 transmits a cell update message to the RRC entity 207 of the network 202 at step 212. The RRC entity 207 of the network 202 transmits a cell update confirm message as a response message to receiving the cell update message to the RRC entity 204 of the UE 201 at step 213. After receiving the cell update confirm message from the RRC entity 207 of the network 202, the RRC entity 204 of the UE 201 transmits a UTRAN mobility confirm message to the RRC entity 207 of the network 202 at step 214.

After performing the cell update process with the RRC entity 207 of the network 202, the RRC entity 204 of the UE 201 transmits an IDT message to the RLC entity 206 of the network 202 at step 215, in response to which the RLC entity 206 of the network 202 transmits an L2 ACK message for IDT to the RRC entity 204 of the UE 201 at step 216.

When the RRC entity 204 of the UE 201 receives the L2 ACK message from the RLC entity 206 of the network 202, the RRC entity 204 may be in an OOS situation due to various reasons at step 217.

After transmitting the L2 ACK message to the RRC entity 204 of the UE 201, the RLC entity 206 of the network 202 transmits an IDT message to the RRC entity 207 of the network 202 at step 218. After receiving the IDT message from the RLC entity 206 of the network 202, the RRC entity 207 of the network 202 transmits an SMC message to the RLC entity 206 of the network 202 at step 219. For example, the SMC message includes security parameters such as an HFN and activation time, and may be implemented in various formats that will not be described herein. The security parameters included in the SMC message are new security parameters which are updated compared to old security parameters.

After receiving the SMC message from the RRC entity 207 of the network 202, the RLC entity 206 of the network 202 transmits PDU#100 and PDU#101 to the RLC entity 205 of the UE 201 at step 220. PDU#100 and PDU#101 correspond to the SMC message.

The RLC entity 206 and RRC entity 207 of the network 202 perform an integrity and ciphering configuration update process based on the new security parameters, i.e., the HFN and activation time included in the SMC message at step 221. The activation time denotes time from which the HFN included in the SMC message will be applied.

As described above, the RRC entity 204 of the UE 201 is in an OOS situation, and thus may not receive the SMC message (i.e., PDU#100 and PDU#101) transmitted by the RRC entity 207 of the network 202. Thus, the RRC entity 204 of the UE 201 loses synchronization with a serving cell, and enters the FACH OOS situation at step 222.

The RRC entity 207 of the network 202 recognizes that the RRC entity 204 of the UE 201 enters the FACH OOS situation. Thus, the RLC entity 206 and RRC entity 207 of the network 202 perform a rollback process to update security parameters into old security parameters at step 223. For example, if an SMC complete message is not received from the RRC entity 204 of the UE 201, the RRC entity 207 of the network 202 recognizes that the RRC entity 204 of the UE 201 enters the FACH OOS situation.

The RRC entity 204 of the UE 201 which enters the FACH OOS situation performs a cell reselection process to select a new cell, and performs a camp-on process for the new cell at step 224. In FIGS. 2A and 2B, it will be assumed that about 10 seconds elapse from when the RRC entity 204 of the UE 201 enters an OOS situation to when the RRC entity 204 of the UE 201 performs the camp-on process for the new cell. After performing the camp-on process for the new cell, the RRC entity 204 of the UE 201 performs a cell update process with the RRC entity 207 of the network 202 by transmitting a cell update message to the RRC entity 207 of the network 202 at step 225. The RRC entity 207 of the network 202 transmits a cell update confirm message as a response message to receiving the cell update message to the RRC entity 204 of the UE 201 at step 226. After receiving the cell update confirm message from the RRC entity 207 of the network 202, the RRC entity 204 of the UE 201 transmits a UTRAN mobility confirm message to the RRC entity 207 of the network 202 at step 227.

If a process for IDT for an old voice call is not performed during a preset time, the NAS entity 208 of the network 202 determines to release a connection which is established in a related domain, and transmits an SCR message to the RRC entity 207 of the network 202 at step 228. The preset time may be changed according to a system situation of the wireless communication system, and it will be assumed herein that the preset time is set to less than 10 seconds in FIGS. 2A and 2B. That is, since it has been assumed that the time is about 10 seconds from when the RRC entity 204 of the UE 201 enters the OOS situation to when the RRC entity 204 of the UE 201 performs the camp-on process for the new cell, the NAS entity 208 of the network 202 determines to release the connection.

After receiving the SCR message from the NAS entity 208 of the network 202, the RRC entity 207 of the network 202 transmits an SCR message to the RLC entity 206 of the network 202 at step 229. After receiving the SCR message from the RRC entity 207 of the network 202, the RLC entity 206 of the network 202 generates PDU #102 corresponding to the SCR message, and transmits PDU#102 to the RLC entity 205 of the UE 201 at step 230. PDU#102 corresponding to the SCR message is generated after the rollback process is performed. Thus, PDU#102 is ciphered based on the old security parameters and is transmitted to the RLC entity 205 of the UE 201.

After performing the cell update process according to the cell reselection process, the RLC entity 205 of the UE 201 receives PDU#102 transmitted by the RLC entity 206 of the network 202. Since the RLC entity 205 of the UE 201 does not receive the SMC message, the RLC entity 205 of the UE 201 performs a deciphering process on PDU#102 received from the RLC entity 206 of the network 202 based on the old security parameters. When the deciphering process has been successfully performed, that is, if a result of the deciphering process indicates a ciphering success, the RLC entity 205 of the UE 201 detects that there are missing PDUs within a reception window. That is, the RLC entity 205 of the UE 201 detects that PDU#100 and PDU#101 have been missing.

Thus, the RLC entity 205 of the UE 201 transmits a NACK message including PDU SNs of the missing PDUs to the RLC entity 206 of the network 202 in order to recover data for the missing PDUs at step 231.

After receiving the NACK message including PDU SNs of the missing PDUs from the RLC entity 205 of the UE 201, the RLC entity 206 of the network 202 transmits PDU#100 and PDU#101 which correspond to PDU SNs included in the NACK message to the RLC entity 205 of the UE 201 at step 232. The RLC entity 205 of the UE 201 generates an SMC message based on PDU#100 and PDU#101 and transmits the generated SMC message to the RRC entity 204 of the UE 201 at step 233. The SMC message which the RLC entity 205 of the UE 201 generates is the SMC message which has not been received due to the FACH OOS situation.

After receiving the SMC message from the RLC entity 205 of the UE 201, the RRC entity 204 of the UE 201 transmits security parameters included in the received SMC message, i.e., new security parameters to the RLC entity 205 of the UE 201 at step 234. The security parameters include, for example, an HFN on which the security parameters will be newly applied, and an activation time from which the HFN will be applied for each RB. For example, in FIGS. 2A and 2B, the activation time is PDU SN 102.

After receiving the security parameters from the RRC entity 204 of the UE 201, the RLC entity 205 of the UE 201 detects the activation time, i.e., PDU SN 102. Since PDU#102 of PDU SN which is identical to PDU SN 102 is successfully received using the old security parameters, the RLC entity 205 of the UE 201 detects that the network 202 communicates with the UE 201 using the old security parameters instead of the new security parameters through a rollback process. That is, the RLC entity 205 of the UE 201 detects a need to discard the new security parameters received in the SMC message and to perform a rollback process at step 235. The RLC entity 205 of the UE 201 transmits an SCR message to the RRC entity 204 of the UE 201 at step 236.

After receiving the SCR message from the RLC entity 205 of the UE 201, the RRC entity 204 of the UE 201 performs an integrity process on the SCR message, and detects success as a result. The RRC entity 204 of the UE 201 determines that the received new security parameters are different from the old security parameters at step 237. The RRC entity 204 of the UE 201 transmits a release indication (Release IND) message to the NAS entity 203 at step 238.

Since the RLC entity 205 of the UE 201 detects a need to discard the new security parameters received in the SMC message and to perform the rollback process, the RLC entity 205 of the UE 201 transmits a cipher configuration abort request (CipherConfigAbortReq) message for requesting to cancel the new security parameters to the RRC entity 204 of the UE 201 at step 239. The RRC entity 204 of the UE 201 transmits a new security configuration cancel message to the RLC entity 205 of the UE 201 in response to the CipherCofigAbortReq message at step 240. The RLC entity 205 and RRC entity 204 of the UE 201 update security parameters into old security parameters by performing a rollback process at step 241.

The RLC entity 206 of the network 202 transmits next PDUs, such as PDU#103, PDU#104, and PDU#105 to the RLC entity 205 of the UE 201 at steps 242, 244, and 246. The next PDUs are generated by applying a ciphering process based on the old security parameters.

After receiving the next PDUs from the RLC entity 206 of the network 202, the RLC entity 205 of the UE 201 performs a deciphering process on the received PDUs based on the old security parameters. As described above, the RLC entity 206 and RRC entity 207 of the network 202 have updated the security parameters to the old security parameters according to the rollback process, and the RRC entity 204 and RLC entity 205 of the UE 201 have updated the security parameters to the old security parameters according to the rollback process. Thus, the result of the deciphering process which is performed on the received PDUs indicates a ciphering success at steps 243, 245, and 247. Thus, PDUs which indicate the ciphering success, i.e., the next PDUs are normally processed.

In this manner, the RLC entity 205 of the UE 201 transmits next PDUs such as PDU#200 and PDU#201, to the RLC entity 206 of the network 202 at steps 248 and 250. The next PDUs transmitted in the RLC entity 205 of the UE 201 are generated by applying a ciphering process based on the old security parameters.

After receiving the next PDUs from the RLC entity 205 of the UE 201, the RLC entity 206 of the network 202 performs a deciphering process on the received PDUs based on the old security parameters. As described above, the RLC entity 206 and RRC entity 207 of the network 202 have updated the security parameters to the old security parameters according to the rollback process, and the RRC entity 204 and RLC entity 205 of the UE 201 have updated the security parameters to the old security parameters according to the rollback process. Thus, the result of the deciphering process which is performed on the received PDUs indicates a ciphering success at operations 249 and 251. As such, PDU#200 and PDU#201 are normally processed.

After updating the security parameters to the old security parameters through the rollback process, the network 202 may normally communicate with the UE 201, so it will be understood that the UE 201 updates the security parameters to the old security parameters through the rollback process. If a security mode is controlled in the manner described with reference to FIGS. 2A and 2B, a communication impossibility status due to an incongruity between security parameters used in a UE and security parameters used in a network is prevented.

Although FIGS. 2A and 2B illustrate another example of a process of controlling a security mode in a wireless communication system according to an embodiment of the present disclosure, various changes could be made to FIGS. 2A and 2B. For example, although shown as a series of steps, various steps in FIGS. 2A and 2B could overlap, occur in parallel, occur in a different order, or occur multiple times.

Figure 3A:
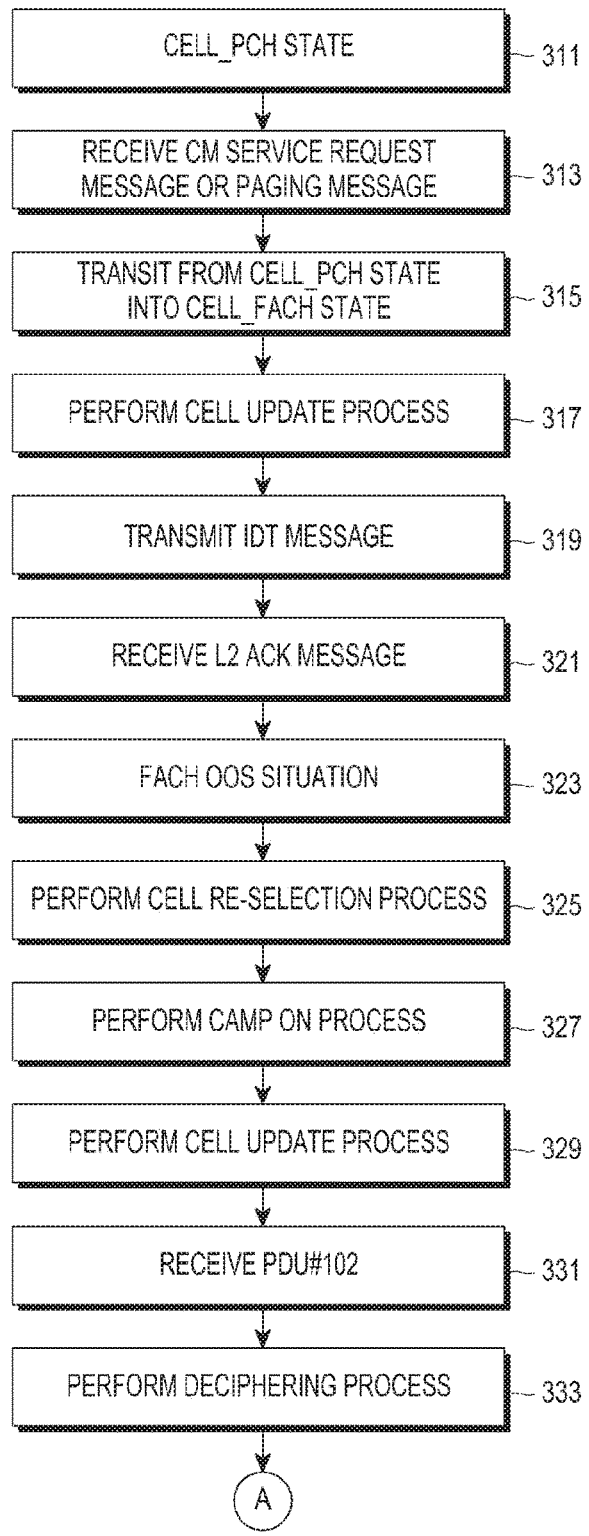
FIGS. 3A and 3B illustrate a process of controlling a security mode in a UE in a wireless communication system according to an embodiment of the present disclosure.
Figure 3B:
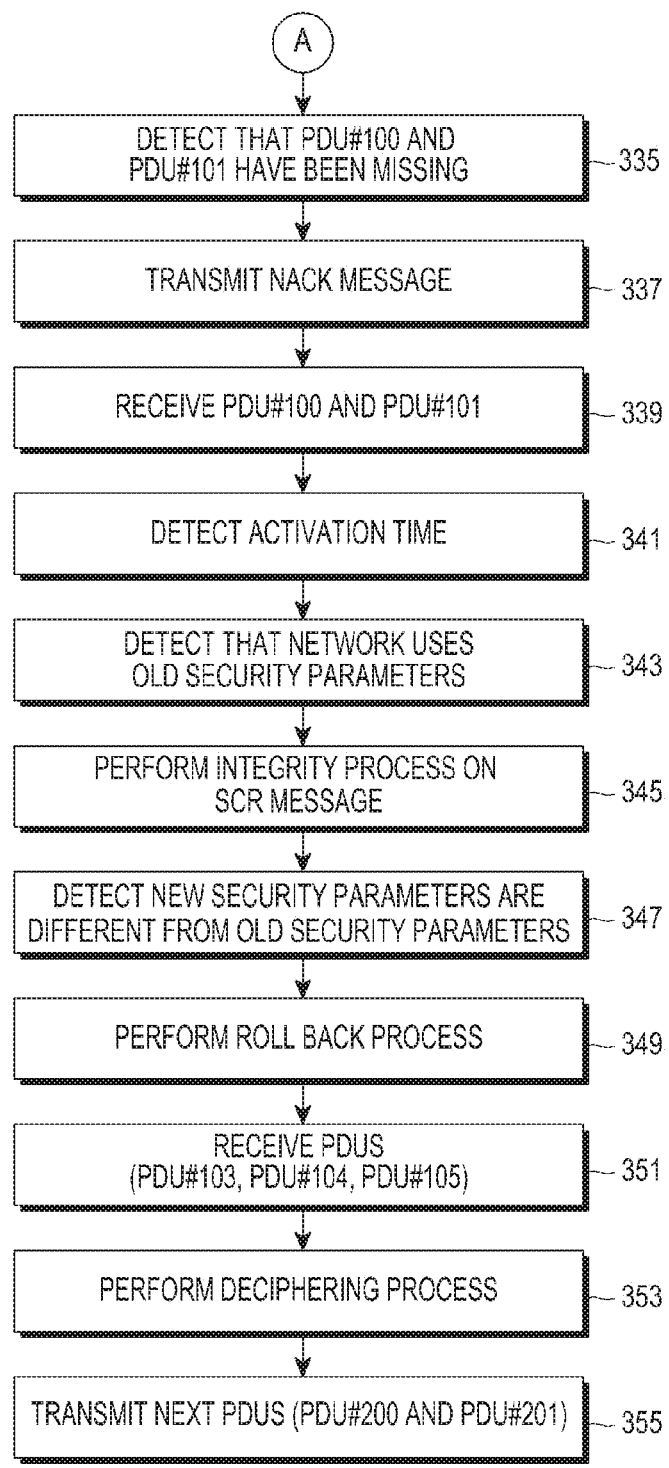

FIGS. 3A and 3B illustrate a process of controlling a security mode in a UE in a wireless communication system according to an embodiment of the present disclosure.

Referring to FIGS. 3A and 3B, the UE is an MO UE, exists in a Cell_PCH state at step 311, and detects that a CM service request message for an MO voice call or a paging message for an MT voice call is received at step 313. The UE transitions from the Cell_PCH state into a Cell_FACH state at step 315.

The UE performs a cell update process with a network at step 317, in a process which has been described in FIGS. 2A and 2B. Thus, a detailed description thereof will be omitted herein. The UE transmits an IDT message to the network at step 319. The UE receives an L2 ACK message for IDT from the network at step 321.

The UE enters an FACH OOS situation due to various reasons at step 323, and performs a cell re-selection process to select a new cell at step 325. The UE performs a camp-on process for the selected new cell at step 327. The UE performs a cell update process with the network at step 329. The processes of performing the camp-on and the cell update with the network have been described with reference to FIGS. 2A and 2B, and a detailed description thereof will be omitted herein.

The UE receives PDU#102, which corresponds to an SCR message, from the network at step 331. The UE performs a deciphering process on the received PDU#102 based on old security parameters at step 333. The UE detects that PDU#100 and PDU#101 are missing within a reception window based on the deciphering process result at step 335. PDU#100 and PDU#101 correspond to an SMC message. The UE transmits a NACK message including PDU SNs for the missing PDUs to the network in order to recover data for the missing PDUs at step 337.

The UE receives PDU#100 and PDU#101 from the network at step 339. PDU#100 and PDU#101 correspond to the SMC message which is not received in the UE due to the FACH OOS situation. The UE generates an SMC message based on PDU#100 and PDU#101, and detects activation time, e.g., PDU SN 102 from the new security parameters included in the received SMC message at step 341.

Since PDU#102 of PDU SN which is identical to PDU SN 102 is successfully received using the old security parameters, the UE detects that the network communicates with the UE using the old security parameters instead of the new security parameters through the rollback process at step 343. That is, the UE detects a need to discard the new security parameters received in the SMC message and to perform a rollback process.

The UE performs an integrity process on the SCR message, and detects an integrity check success as a result of the integrity process at step 345. The UE detects that the received new security parameters are different from the old security parameters at step 347. The UE updates the security parameters to the old security parameters by performing the rollback process at step 349.

The UE receives next PDUs such as PDU#103, PDU#104, and PDU#105 from the network at step 351. The UE performs a deciphering process on the received PDUs based on the old security parameters at step 353. As described above, the network has updated the security parameters to the old security parameters according to the rollback process, and the UE has updated the security parameters to the old security parameters according to the rollback process. Thus, the result of the deciphering process which is performed on the received PDUs indicates a ciphering success, and the next PDUs are normally processed.

In this manner, the UE transmits next PDUs, such as PDU#200 and PDU#201, to the network at step 355. These next PDUs transmitted in the UE are generated by applying a ciphering process based on the old security parameters.

Although FIGS. 3A and 3B illustrate a process of controlling a security mode in a UE in a wireless communication system according to an embodiment of the present disclosure, various changes could be made to FIGS. 3A and 3B. For example, although shown as a series of steps, various steps in FIGS. 3A and 3B could overlap, occur in parallel, occur in a different order, or occur multiple times.

Figure 4A:
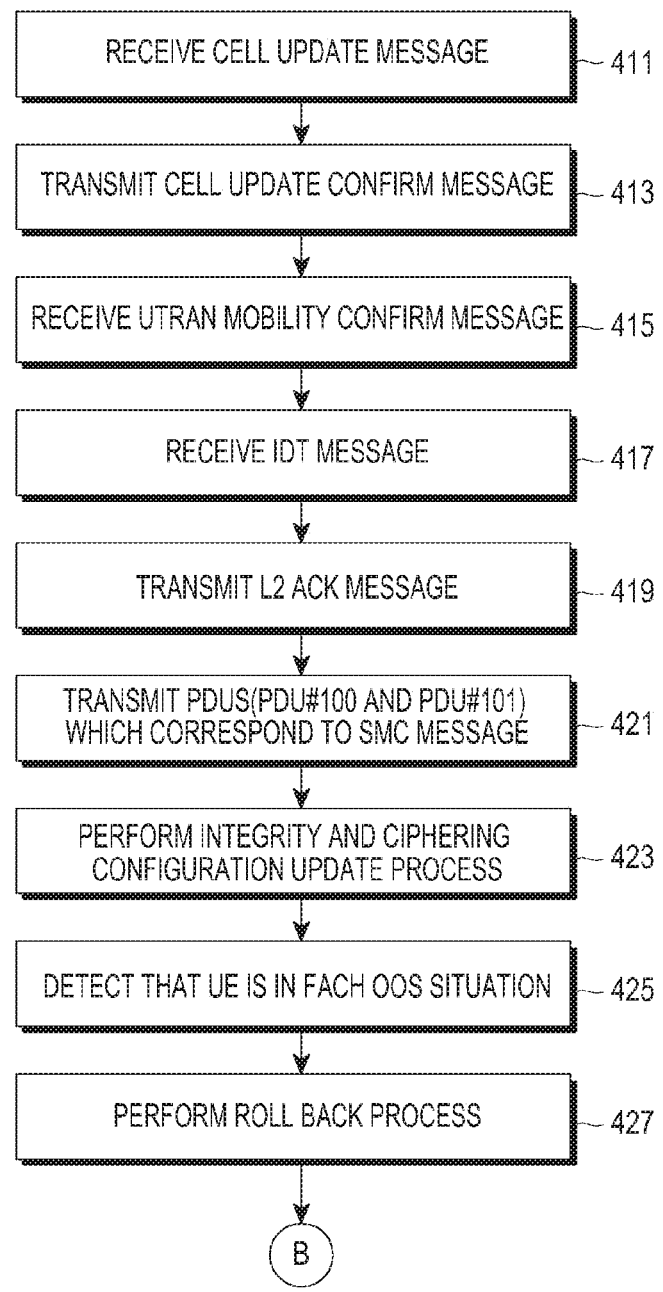
FIGS. 4A and 4B illustrate a process of controlling a security mode in a network in a wireless communication system according to an embodiment of the present disclosure.
Figure 4B:
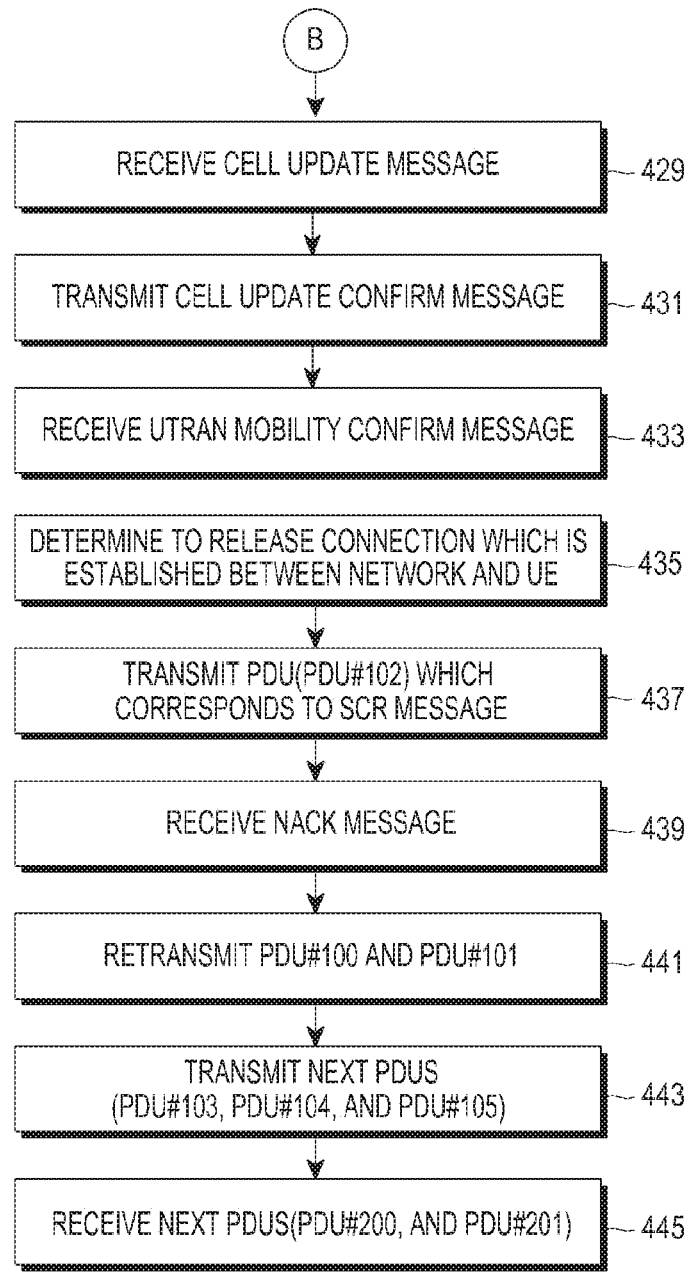

FIGS. 4A and 4B illustrate a process of controlling a security mode in a network in a wireless communication system according to an embodiment of the present disclosure.

Referring to FIGS. 4A and 4B, the network receives a cell update message from a UE at step 411. The network transmits a cell update confirm message as a response message to the cell update message to the UE at step 413.

The network receives a UTRAN mobility confirm message from the UE at step 415. Steps 411 to 415 correspond to a cell update process, and thus a description thereof will be omitted herein.

The network receives an IDT message from the UE at step 417. The network transmits an L2 ACK message for the IDT to the UE at step 419. The network generates an SMC message, generates PDU#100 and PDU#101 which correspond to the SMC message, and transmits PDU#100 and PDU#101 to the UE at step 421. For example, the SMC message includes security parameters such as an HFN and activation time, and the security parameters may be implemented with various formats which will be omitted herein. The security parameters included in the SMC message are new security parameters which are updated compared to old security parameters.

The network performs an integrity and ciphering configuration update process based on the new security parameters included in the SMC message at step 423. The integrity and ciphering configuration update process is performed based the HFN and the activation time included in the SMC message. The activation time denotes time from which the HFN included in the SMC message will be applied. The network detects that the UE is in an FACH OOS situation at step 425. The network performs a rollback process to update security parameters to the old security parameters at step 427.

The network receives a cell update message from the UE at step 429. The network transmits a cell update confirm message as a response message to the cell update message to the UE at step 431. The network receives a UTRAN mobility confirm message from the UE at step 433. Steps 431 to 435 correspond to a cell update process between the UE and the network which have performed a camp-on process, and a description thereof will be omitted herein.

Since the UE is in the FACH OOS situation for a longer period of time than preset time, the network determines to release a connection which is established between the network and the UE, and generates an SCR message at step 435. The network generates PDU#102 which corresponds to the SCR message, and transmits PDU#102 to the UE at step 437. Since PDU#102 which corresponds to the SCR message is generated after the rollback process is performed, PDU#102 is transmitted to the UE after being ciphered based on the old security parameters.

The network receives a NACK message including PDU SNs for missing PDUs from the UE at step 439. For example, the missing PDUs are PDU#100 and PDU#101 which correspond to the SMC message. The network retransmits PDU#100 and PDU#101 to the UE at step 441.

The network transmits the next PDUs such as PDU#103, PDU#104, and PDU#105 to the UE at step 443. These next PDUs transmitted in the network are generated by applying a ciphering process based on old security parameters. The network receives next PDUs PDU#200 and PDU#201 from the UE at step 445. After receiving these next PDUs from the UE, the network performs a deciphering process on the received PDUs based on the old security parameters. As described above, the network has updated the security parameters to the old security parameters according to the rollback process, and the UE has updated the security parameters to the old security parameters according to the rollback process. Thus, the result of the deciphering process which is performed on the received PDUs indicates a ciphering success. As such, PDUs which indicate the ciphering success, i.e., PDU#200 and PDU#201, are normally processed.

Although FIGS. 4A and 4B illustrate a process of controlling a security mode in a network in a wireless communication system according to an embodiment of the present disclosure, various changes could be made to FIGS. 4A and 4B. For example, although shown as a series of steps, various steps in FIGS. 4A and 4B could overlap, occur in parallel, occur in a different order, or occur multiple times.

Figure 5:
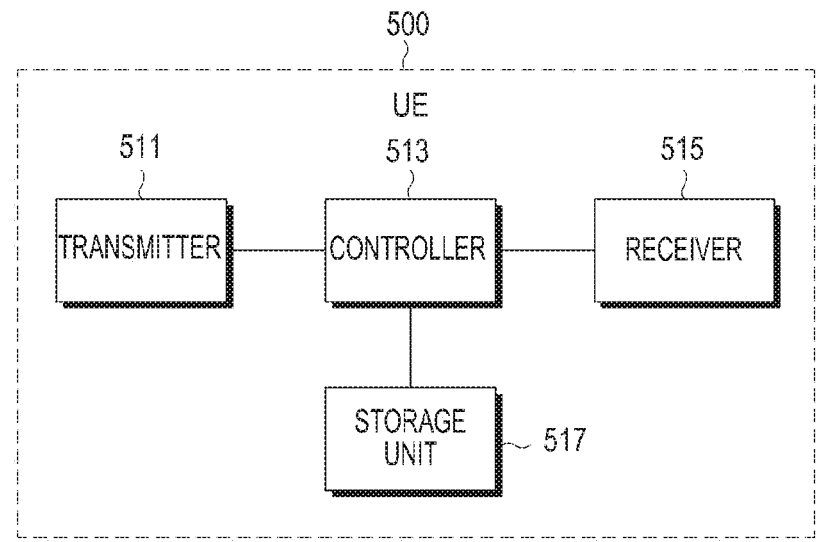
FIG. 5 illustrates an inner structure of a UE in a wireless communication system according to an embodiment of the present disclosure.

FIG. 5 illustrates an inner structure of a UE in a wireless communication system according to an embodiment of the present disclosure.

Referring to FIG. 5, a UE 500 includes a transmitter 511, a controller 513, a receiver 515, and a storage unit 517.

The controller 513 controls the overall operation of the UE 500. More particularly, the controller 513 controls the UE 500 to control a security mode according to an embodiment of the present disclosure, such that a security configuration which is used in a UE is identical to a security configuration which is used in a network. As this security mode control by controller 513 is performed in the manner described with reference to FIGS. 1 to 4B, a description thereof will be omitted herein.

The transmitter 511 transmits various signals and messages to a network, under a control of the controller 513. The various signals and messages transmitted in the transmitter 511 have been described in FIGS. 1 to 4B, and a description thereof will be omitted herein.

The receiver 515 receives various signals and messages from the network, under a control of the controller 513. The various signals and messages received in the receiver 515 have been described in FIGS. 1 to 4B, and a description thereof will be omitted herein.

The storage unit 517 stores a program and various data necessary for the operation of the UE 500, and information related to the operation of controlling the security mode such that the security configuration which is used in the UE is identical to the security configuration which is used in the network according to an embodiment of the present disclosure. The storage unit 517 stores the various signals and messages received in the receiver 515.

While the transmitter 511, the controller 513, the receiver 515, and the storage unit 517 are described as separate units, two or more of the transmitter 511, the controller 513, the receiver 515, and the storage unit 517 may be incorporated into a single unit.

Figure 6:
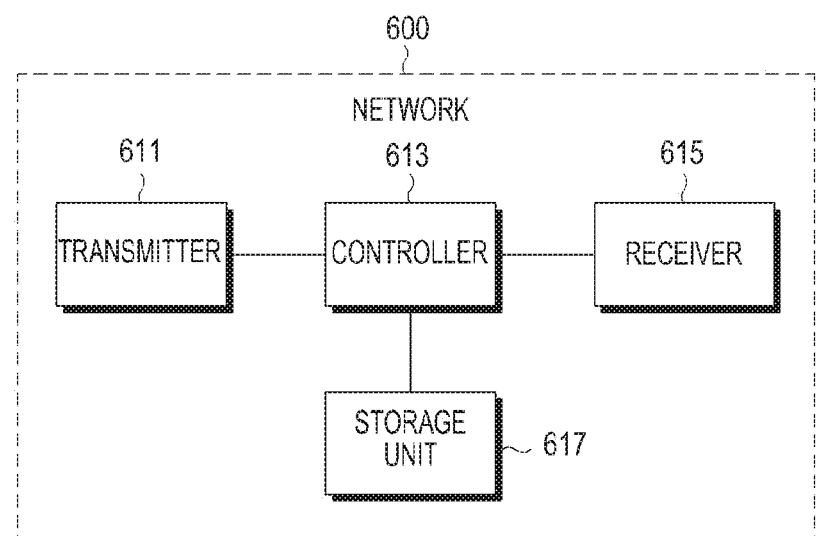
FIG. 6 illustrates an inner structure of a network in a wireless communication system according to an embodiment of the present disclosure.

FIG. 6 illustrates an inner structure of a network in a wireless communication system according to an embodiment of the present disclosure.

Referring to FIG. 6, a network 600 includes a transmitter 611, a controller 613, a receiver 615, and a storage unit 617.

The controller 613 controls the overall operation of the network 600. More particularly, the controller 613 controls the network 600 to control a security mode such that security configuration which is used in a UE is identical to security configuration which is used in a network. As this security mode control by controller 613 is performed in the manner described with reference to FIGS. 1 to 4B, a description thereof will be omitted herein.

The transmitter 611 transmits various signals and messages to a UE, under a control of the controller 613. The various signals, the various messages, transmitted in the transmitter 611 have been described in FIGS. 1 to 4B, and a description thereof will be omitted herein.

The receiver 615 receives various signals and messages from the UE, under a control of the controller 613. The various signals and messages received in the receiver 615 have been described in FIGS. 1 to 4B, and a description thereof will be omitted herein.

The storage unit 617 stores a program and various data necessary for the operation of the network 600, and information related to the operation of controlling the security mode such that the security configuration which is used in the UE is identical to the security configuration which is used in the network according to an embodiment of the present disclosure. The storage unit 617 stores the various signals and messages received in the receiver 615.

While the transmitter 611, the controller 613, the receiver 615, and the storage unit 617 are described as separate units, two or more of the transmitter 611, the controller 613, the receiver 615, and the storage unit 617 may be incorporated into a single unit.

As is apparent from the foregoing description, an embodiment of the present disclosure enables control of a security mode in a wireless communication system.

An embodiment of the present disclosure enables control of a security mode such that a security configuration set in a UE is identical to a security configuration set in a network in a wireless communication system.

An embodiment of the present disclosure enables control of a security mode by considering communication status of a UE in a wireless communication system.

An embodiment of the present disclosure enables control of a security mode based on an integrity check result in a wireless communication system.

An embodiment of the present disclosure enables control of a security mode based on a deciphering result in a wireless communication system.

Certain aspects of the present disclosure may also be embodied as computer readable code on a non-transitory computer readable recording medium. A non-transitory computer readable recording medium is any data storage device that can store data, which can be thereafter read by a computer system. Examples of the non-transitory computer readable recording medium include read only memory (ROM), random access memory (RAM), CD-ROMs, magnetic tapes, floppy disks, optical data storage devices, and carrier waves (such as data transmission through the Internet). The non-transitory computer readable recording medium can also be distributed over network coupled computer systems so that the computer readable code is stored and executed in a distributed fashion. In addition, functional programs, code, and code segments for accomplishing the present disclosure can be easily construed by programmers skilled in the art to which the present disclosure pertains.

It can be appreciated that a method and apparatus according to an embodiment of the present disclosure may be implemented by hardware, software and/or a combination thereof. The software may be stored in a non-volatile storage, for example, an erasable or re-writable ROM, a memory, for example, a RAM, a memory chip, a memory device, or a memory integrated circuit (IC), or an optically or magnetically recordable non-transitory machine-readable (e.g., computer-readable), storage medium such as a compact disc (CD), a digital versatile disk (DVD), a magnetic disk, or a magnetic tape. A method and apparatus according to an embodiment of the present disclosure may be implemented by a computer or a mobile terminal that includes a controller and a memory, and the memory may be an example of a non-transitory machine-readable (e.g., computer-readable), storage medium suitable to store a program or programs including instructions for implementing embodiments of the present disclosure.

The present disclosure may include a program including code for implementing the apparatus and method as defined by the appended claims, and a non-transitory machine-readable (e.g., computer-readable), storage medium storing the program. The program may be electronically transferred via any media, such as communication signals, which are transmitted through wired and/or wireless connections, and the present disclosure may include their equivalents.

An apparatus according to an embodiment of the present disclosure may receive the program from a program-providing device which is connected to the apparatus via a wire or a wireless and store the program. The program-providing device may include a memory for storing instructions which instruct to perform a content protect method which has been already installed, information necessary for the content protect method, a communication unit for performing a wired or a wireless communication with a graphic processing device, and a controller for transmitting a related program to a transmitting/receiving device based on a request of the graphic processing device or automatically transmitting the related program to the transmitting/receiving device.

While the present disclosure has been shown and described with reference to embodiments thereof, it will be understood by those skilled in the art that various changes in form and details may be made therein without departing from the spirit and scope of the present disclosure as defined by the appended claims and their equivalents.

What is claimed is:

1. A method for controlling a security mode by a terminal in a wireless communication system, the method comprising:
    performing a camp-on process and a cell update process with a network when an out-of-service (OOS) situation has occurred;
    receiving a first protocol data unit (PDU) including a signal connection release (SCR) message from the network;
    detecting that at least one PDU, of which a PDU serial number (SN) is less than a PDU SN of the first PDU, has been missing;
    transmitting a non-acknowledge (NACK) message to the network with the PDU SN of the at least one PDU;
    receiving a second PDU corresponding to the at least one missing PDU including a security mode command (SMC) message from the network, the SMC message including a new security parameter when the first PDU is received;
    performing an integrity process on the SCR message using an old security parameter; and
    performing a rollback process to discard the new security parameter when a result of the integrity process indicates an integrity check success, and updating a security parameter to the old security parameter.

2. The method of claim 1, wherein the SMC message comprises security parameters including a hyper frame number (HFN) and an activation time of the HFN.

3. The method of claim 1, wherein performing the rollback process and updating the security parameter comprises:
    detecting that the network has performed the rollback process to update the security parameter to the old security parameter when the new security parameter includes a hyper frame number (HFN) on which the new security parameter will be applied and an activation time at which the HFN will be applied for each radio bearer (RB), and when a timing point at which the SCR message is transmitted is after the activation time; and
    performing the rollback process to discard the new security parameter, and updating the security parameter to the old security parameter after detecting that the network has updated the security parameter to the old security parameter.

4. The method of claim 2, wherein the activation time includes a PDU SN.

5. The method of claim 1, wherein performing the camp-on process and the cell update process comprises:
transitioning from a cell_paging channel (Cell_PCH) state into a cell_forward access channel (Cell_FACH) state;
performing the cell update process with the network in the Cell_FACH state;
transmitting an initial data transfer (IDT) message to the network;
receiving a layer 2 acknowledgement (L2 ACK) message from the network in response to the IDT message; and
performing the camp-on process and the cell update process with the network upon detecting that an FACH OOS situation has occurred.

6. The method of claim 1, further comprising:
performing a cell reselection process to select a new cell when a radio resource control (RRC) entity of the terminal is in the FACH OOS situation.

7. The method of claim 1, further comprising:
receiving a third PDU ciphered based on the old security parameter from the network after performing the rollback process; and
performing a deciphering operation on the third PDU based on the old security parameters.

8. A method for controlling a security mode by a network in a wireless communication system, the method comprising:
transmitting a first protocol data unit (PDU) including a security mode command (SMC) message with a new security parameter to a terminal;
updating a security parameter to the new security parameter;
performing a rollback process to discard the new security parameter, and updating the security parameter to an old security parameter, upon detecting that the terminal is in an out-of-service (OOS) situation;
performing a camp-on process and a cell update process with the terminal;
transmitting a second PDU including a signaling connection release (SCR) message to the terminal;
receiving a non-acknowledgement (NACK) message for the first PDU from the terminal;
retransmitting the first PDU to the terminal; and
after retransmitting the first PDU, detecting that the terminal has performed the rollback process to discard the new security parameter and updated the security parameter to the old security parameter, upon detecting that the terminal has successfully received at least one third PDU after transmitting the at least one third PDU from the network to the terminal or upon successfully receiving the at least one third PDU from the terminal.

9. The method of claim 8, wherein the new security parameter includes a hyper frame number (HFN) on which the new security parameter will be applied and an activation time at which the HFN will be applied for each radio bearer (RB), and
wherein the activation time includes a specific PDU serial number (SN).

10. The method of claim 8, further comprising:
performing the cell update process with the terminal before transmitting the SMC message;
receiving an initial data transfer (IDT) message from the terminal after performing the cell update process; and
transmitting a layer 2 acknowledgement (L2 ACK) message to the terminal in response to the IDT message.

11. A method for controlling a security mode by a network in a wireless communication system, the method comprising:
transmitting at least one protocol data unit (PDU), which corresponds to a security mode command (SMC) message including a new security parameter, to a terminal;
updating a security parameter to the new security parameter;
performing a rollback process to discard the new security parameter, and updating the security parameter to an old security parameter, upon detecting that the terminal is in an out-of-service (OOS) situation;
performing a cell reselection process with the terminal;
transmitting a signaling connection release (SCR) message from a radio resource control (RRC) entity of the network to a RLC entity of the network;
transmitting a first PDU to the terminal, wherein the first PDU corresponds to the SCR message;
receiving a non-acknowledgement (NACK) message for the at least one PDU from the terminal;
retransmitting the at least one PDU to the terminal; and
detecting that the terminal has performed the rollback process to discard the new security parameter and updated the security parameter to the old security parameter, upon detecting that the terminal has successfully received at least one other message after transmitting the at least one other message to the terminal or successfully receiving the at least one other message from the terminal or, after retransmitting the at least one PDU.

12. The method of claim 11, wherein the new security parameter includes a hyper frame number (HFN) on which the new security parameter will be newly applied and an activation time at which the HFN will be applied for each radio bearer (RB), and
wherein the activation time includes a specific PDU serial number (SN).

13. The method of claim 12, further comprising:
performing the cell update process with the terminal before transmitting the at least one PDU;
receiving an initial data transfer (IDT) message from the terminal after performing the cell update process; and
transmitting a layer 2 acknowledgement (L2 ACK) message to the terminal in response to the IDT message.

14. A terminal in a wireless communication system, the terminal comprising:
a transmitter;
a receiver; and
a controller,
wherein the transmitter and the receiver perform performing a camp-on process and a cell update process with a network when an out-of-service (OOS) situation has occurred,
wherein the receiver receives one of a signaling connection release (SCR) message and a first protocol data unit (PDU) which corresponds to the SCR message from the network, and receives a security mode command (SMC) message from the network when the SCR message is received, and
wherein the controller performs an integrity process on the SCR message using an old security parameter, and performs a rollback process to discard a new security parameter included in the SMC message when a result of the integrity process indicates an integrity check success, and updates a security parameter to the old security parameter.

15. The terminal of claim 14, wherein performing the rollback process and updating the security parameter comprises:
    detecting that the network has performed the rollback process to update the security parameter to the old security parameter when the new security parameter includes a hyper frame number (HFN) on which the new security parameter will be applied and an activation time at which the HFN will be applied for each radio bearer (RB), and when a timing point at which the SCR message is transmitted is after the activation time; and
    performing the rollback process to discard the new security parameter, and updating the security parameter to the old security parameter after detecting that the network has updated the security parameter to the old security parameter.

16. The terminal of claim 15, wherein the activation time includes a serial number (SN) of the first PDU.

17. The terminal of claim 14, wherein performing the camp-on process and the cell update process comprises:
    transitioning from a cell_paging channel (Cell_PCH) state into a cell_forward access channel (Cell_FACH) state;
    performing the cell update process with the network in the Cell_FACH state;
    transmitting an initial data transfer (IDT) message to the network;
    receiving a layer 2 acknowledgement (L2 ACK) message from the network in response to the IDT message; and
    performing the camp-on process and the cell update process with the network upon detecting that an FACH OOS situation has occurred.

18. The terminal of claim 14, wherein the controller detects that at least one PDU, of which a PDU serial number (SN) is less than a PDU SN of the first PDU, has been missing, when the first PDU which corresponds to the SCR message is received,
    wherein the transmitter transmits a non-acknowledgement (NACK) message for the at least one PDU to the network,
    wherein the receiver receives the at least one PDU from the network, wherein the at least one PDU corresponds to the SMC message received from the network, and
    wherein the controller further performs the integrity process on the SCR message corresponding to the first PDU using the old security parameter, and performs the rollback process to discard the new security parameter included in the SMC message corresponding to the at least one PDU when the integrity process indicates the integrity check success, and updates the security parameter to the old security parameter.

19. The terminal of claim 18, wherein performing the rollback process and updating the security parameter comprises:
    detecting that the network has performed the rollback process to update the security parameter to the old security parameter when the new security parameter includes a hyper frame number (HFN) on which the new security parameter will be applied and an activation time at which the HFN will be applied for each radio bearer (RB), wherein the activation time includes a specific PDU SN, and the PDU SN of the first PDU is greater than the specific PDU SN; and
    performing the rollback process to discard the new security parameter, and updating the security parameter to the old security parameter after detecting that the network has updated the security parameter to the old security parameter.

20. The terminal of claim 18, wherein performing the camp-on process and the cell update process comprises:
    transitioning from a cell_paging channel (Cell_PCH) state into a cell_forward access channel (Cell_FACH) state;
    performing the cell update process with the network in the Cell_FACH state;
    transmitting an initial data transfer (IDT) message to the network;
    receiving a layer 2 acknowledgement (L2 ACK) message from the network in response to the IDT message; and
    performing the camp-on process and the cell update process with the network upon detecting that an FACH OOS situation has occurred.

* * * * *